(12) United States Patent
Stewart et al.

(10) Patent No.: US 7,471,749 B2
(45) Date of Patent: Dec. 30, 2008

(54) CHANNEL PARAMETERS ESTIMATION IN A RECEIVER

(75) Inventors: Kenneth A. Stewart, Grayslake, IL (US); Raja S. Bachu, Waukegan, IL (US); Michael E. Buckley, Grayslake, IL (US); Clint S. Wilkins, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 680 days.

(21) Appl. No.: 10/694,464

(22) Filed: Oct. 27, 2003

(65) Prior Publication Data

US 2004/0161063 A1 Aug. 19, 2004

(51) Int. Cl.
*H04L 25/08* (2006.01)
(52) U.S. Cl. .................................. 375/346
(58) Field of Classification Search ............. 375/324, 375/334, 340, 343, 346, 348, 350, 355; 455/63.1, 455/67.13
See application file for complete search history.

(56) References Cited

U.S. PATENT DOCUMENTS

| | | | |
|---|---|---|---|
| 3,978,407 A | 8/1976 | Forney, Jr. et al. | |
| 4,152,649 A | 5/1979 | Choquet | |
| 4,290,139 A | 9/1981 | Walsh | |
| 4,881,240 A | 11/1989 | Critchlow et al. | |
| 5,168,507 A | 12/1992 | Critchlow et al. | |
| 5,335,250 A | 8/1994 | Dent et al. | |
| 5,678,222 A | 10/1997 | Hornak et al. | |
| 5,724,390 A | 3/1998 | Blaker et al. | |
| 5,732,113 A * | 3/1998 | Schmidl et al. | 375/355 |
| 5,875,208 A * | 2/1999 | Hoole | 375/130 |
| 5,930,289 A * | 7/1999 | Laakso et al. | 375/130 |
| 5,933,768 A | 8/1999 | Skold et al. | |
| 5,974,306 A | 10/1999 | Hornak et al. | |
| 6,002,716 A | 12/1999 | Meyer et al. | |
| 6,026,130 A | 2/2000 | Rahmatullah et al. | |
| 6,044,111 A | 3/2000 | Meyer et al. | |
| 6,084,862 A | 7/2000 | Bjork et al. | |
| 6,330,294 B1 | 12/2001 | Ansbro et al. | |
| 6,353,639 B1 | 3/2002 | Prange et al. | |
| 6,363,104 B1 * | 3/2002 | Bottomley | 375/148 |

(Continued)

FOREIGN PATENT DOCUMENTS

WO 9816021 4/1998

(Continued)

OTHER PUBLICATIONS

Trigui, Hafedh; Slock, Dirk T.M.; "Training Sequence Based Multisuer Channel Identification for Cochannel Interference Cancellation GSM", IEEE 1999.

(Continued)

*Primary Examiner*—Khanh C Tran
(74) *Attorney, Agent, or Firm*—Charles W. Bethards; Lawrence J. Chapa

(57) ABSTRACT

Methods (FIGS. 7 and 8) and corresponding apparatus (200) for estimating a parameter (125) associated with a received signal (120), one method comprising: providing (704, 806) a signal sample (129, 301) corresponding to the received signal (120); processing the signal sample (705, 807) to suppress on channel interference and provide a processed sample or signal estimate; and determining, for example, a delay parameter by comparing (709, 809) the processed sample to a predetermined sample.

28 Claims, 4 Drawing Sheets

U.S. PATENT DOCUMENTS

| | | | |
|---|---|---|---|
| 6,463,107 | B1 | 10/2002 | Lindoff et al. |
| 6,512,479 | B1 * | 1/2003 | Sahai et al. ............ 342/357.15 |
| 6,567,486 | B1 * | 5/2003 | Gordon et al. ............. 375/360 |
| 6,587,526 | B1 * | 7/2003 | Li et al. ...................... 375/355 |
| 6,631,173 | B1 * | 10/2003 | Siirtola et al. ............... 375/343 |
| 6,859,491 | B1 | 2/2005 | Zhou |
| 6,907,092 | B1 | 6/2005 | Yakhnich et al. |
| 7,020,226 | B1 * | 3/2006 | Kirkland ..................... 375/355 |
| 7,027,534 | B2 * | 4/2006 | Sahai et al. ................. 375/343 |
| 7,187,736 | B2 | 3/2007 | Buckley et al. |
| 2002/0131488 | A1 | 9/2002 | Allpress et al. |
| 2002/0131489 | A1 | 9/2002 | Allpress et al. |
| 2002/0141437 | A1 | 10/2002 | Meyer et al. |

FOREIGN PATENT DOCUMENTS

| | | |
|---|---|---|
| WO | 0064061 | 10/2000 |

OTHER PUBLICATIONS

"Single Antenna Interface Cancellation in MS Networks"; Cingular Wireless, Phillips Semiconductors, SBC Technology Resources, Inc. 3GPP TSG-Geran #9, Seattle, WA, Apr. 15-19, 2002.

"Downlink GMSK Interference Suppression"; Ericsson, 3GPP TSG Geran #9, Seattle, WA, Apr. 15-19, 2002.

Castoldi, Piero; Raheli, Ricardo; Marino, Giovanni; "Efficient Trellis Search Algorithms for Adaptive MLSE on Fast Rayleigh Fading Channels", IEEE 1994.

Hafeez, Abdulrauf; Molnar, Karl J; Bottomley, Gregory E; "Co-Channel Interference Cancellation for D-AMPS Handsets"; IEEE 1999.

"Laboratory & Field Testing of Saic for GSM Networks"; Cingular Wireless, Phillips Semiconductors; 3GPP TSG Geran #11, Los Angeles, CA, USA; Aug. 26-30, 2002.

3GPP TS 45.002 V5.6.0 (Jun. 2002); "Multiplexing and Multiple Access on the Readio Path".

* cited by examiner

CHANNEL PARAMETERS ESTIMATION IN A RECEIVER

CROSS-REFERENCE TO RELATED APPLICATIONS

The present invention is related to an application entitled "REDUCING INTERFERENCE IN A GSM COMMUNICATION SYSTEM", Ser. No. 10/366,106, by Buckley et al, assigned to the same assignee as the present application, the contents of which are incorporated herein by reference.

FIELD OF THE INVENTION

The present invention relates in general to channel parameter estimation in, for example data receivers, such as mobile receivers, transceivers, base units, and related equipment, and more specifically to improved methods and apparatus for providing this estimation.

BACKGROUND OF THE INVENTION

Classical methods for parameter estimation, including delay and channel estimation in data receivers, such as those used in Global System for Mobile (GSM) terminals typically rely on correlating a received signal burst such as a normal burst, a synchronization burst or the like with a known pattern in the received sequence. In the GSM protocols this known pattern or sequence is often referred to as a midamble or Training Sequence (TS) that is embedded in the central portion of the burst.

Advances in Digital Signal Processors (DSPs) and processing have enabled more extensive and complex calculations that have led to additional techniques to improve channel estimation and other relatively complex signal/data conversions. However DSPs are still limited in performance and these additional capabilities come at the cost of battery life and thermal management issues for increasingly smaller and more complex packages such as portable communications equipment.

At the same time system designers are increasing system capacities or bandwidths and using more complex modulation techniques and communications protocols that dramatically increase processing loads on a DSP or other processing resources. For example, Gaussian Minimum Shift Keying (GMSK) modulation, frequency hopping, significantly higher symbol rates, and increased fixed network transmitter densities are all planned for systems, such as GSM systems. These techniques often result in more rapidly changing channels and in increased levels of interference or noise and, often, increased sensitivities to such channel changes or interference.

Thus noise or interference remain a primary problem facing signal recovery in a receiver. Besides the obvious, common sources of noise or interference are adjacent channel signals or co-channel signals from neighboring transmitters, each capable of generating energy that falls on-channel or may be referred to as on-channel interference. Thus a need exists for improved, preferably less computationally complex techniques for estimating channel parameters. Various modulation methods and systems exist that can benefit from such techniques and advances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Figure 1:
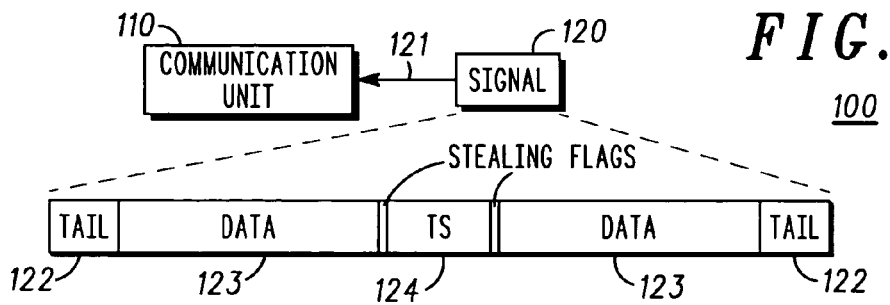
FIG. 1 is a block diagram depicting an exemplary communications unit and an input signal burst.

In overview, the present disclosure concerns the reception of signals on a communication channel associated with a wireless interface to a device such as a stationary or fixed mobile receiver, communications unit, and the like and a method and apparatus for estimating channel related parameters such as, for example, delay or a delay parameter. It should be noted that conventional methods typically require the characterization of a channel, prior to or as part of a signal estimation or recovery process. In accordance with various exemplary embodiments, the present invention allows parameters such as a delay parameter, to be estimated preparatory to characterizing or estimating the "channel".

It will be appreciated that estimating parameters and otherwise processing received signals may be performed in a dedicated device such as a receiver having a dedicated processor, a processor coupled to an analog processing circuit or receiver analog "front-end" with appropriate software for performing a receiver function, an application specific integrated circuit (ASIC), a digital signal processor (DSP), or the like, or various combinations thereof, as would be appreciated by one of ordinary skill. Memory devices may further be provisioned with routines and algorithms for operating on input data and providing output such as operating parameters to improve the performance of other processing blocks associated with, for example, reducing noise and interference, and otherwise appropriately handling the input data.

It will further be appreciated that wireless communications units may refer to subscriber devices such as cellular or mobile phones, two-way radios, messaging devices, personal digital assistants, personal assignment pads, personal computers equipped for wireless operation, a cellular handset or device, or the like, or equivalents thereof provided such units are arranged and constructed for operation in accordance with the various inventive concepts and principles embodied in exemplary receivers, and methods for estimating parameters, such as a delay parameters as discussed and described herein.

The principles and concepts discussed and described may be particularly applicable to receivers and associated communication units, devices, and systems providing or facilitating voice communications services or data or messaging services over wide area networks (WANs), such as conventional two way systems and devices, various cellular phone systems including analog and digital cellular, CDMA (code division multiple access) and variants thereof, GSM (Global System for Mobile communications), GPRS (General Packet Radio System), 2.5 G and 3G systems such as UMTS (Universal Mobile Telecommunication Service) systems, integrated digital enhanced networks and variants or evolutions thereof. Principles and concepts described herein may further be applied in devices or systems with short range communications capability normally referred to as W-LAN capabilities, such as IEEE 802.11, Bluetooth, or Hiper-LAN and the like that preferably utilize CDMA, frequency hopping, orthogonal frequency division multiplexing, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As described in greater detail hereinafter, various inventive principles are employed to provide a more accurate channel related parameter estimate, such as a delay estimate, for a receiver and further to provide reduced computation complexity in deriving such an estimate from a received signal or associated data stream. Further, the inventive principles disclosed and described herein may be used to reduce computation complexity or improve performance when used in connection with other receiver stages such as, for example, output equalization, using one of a variety of methods including alternate linear output equalization (ALOE) as described in the co-pending application noted above, Ser. No. 10/366,106.

Thus a signal sample corresponding to a received signal is provided for processing to suppress, for example, on-channel interference. As earlier noted on channel interference includes noise and interference that is in band, e.g. within the passband of typical known filters that are operating on the received signals to reject off channel or out of band energy due to noise and adjacent channel interference. Typical sources of on-channel noise or energy or interference include neighboring co-channel signals as well as adjacent channel signals and the portion of those signals that fall on-channel for the signal that is being recovered. A delay parameter may be determined by comparing the processed sample to a predetermined sample relying on known or predetermined properties of the received signal, such as a timing value associated with the signal, a known quadrature phase relationship for symbols in a portion of the received signal, or the like as would be discernable in a burst environment or otherwise synchronized or synchronizable environment. A hypothetical delay for the signal sample may be established based on an estimated delay for the received signal, and a received signal estimate may be provided by performing processing in accordance with various exemplary and alternative exemplary embodiments to be described in greater detail hereinafter, using the hypothetical delay, the signal sample, and the predetermined sample. The received signal estimate may be compared to the predetermined or known sample or sequence to generate a difference value and a delay parameter chosen based on the difference value corresponding to the hypothetical delay.

In accordance with various exemplary and alternative exemplary embodiments, Nd hypothetical delays may be established for the signal sample and Nd portions of the signal sample extracted. A corresponding signal estimate is determined for each of the hypothetical delays using the extracted portions and the predetermined sample to provide Nd corresponding signal estimates. Each of the signal estimates may be compared to the predetermined sample to generate difference values; and the delay parameter chosen as the delay parameter corresponding to the appropriate difference value, typically the smallest difference value.

In accordance with still other exemplary and alternative exemplary embodiments, Nd hypothetical delays may be established for the signal sample and a portion of the signal sample extracted corresponding to one of the Nd hypothetical delays and Nd portions of the predetermined sample. A corresponding signal estimate may be determined for each of the Nd hypothetical delays using the Nd portions and the portion of the signal sample to provide Nd corresponding signal estimates. Each the Nd corresponding signal estimates may be compared to the corresponding one of the Nd portions of the predetermined or known sample to generate Nd difference values. The delay parameter may be chosen based on the hypothetical delay corresponding to a minimum or smallest difference value.

It will be appreciated that in accordance with still further exemplary and alternative exemplary embodiments, Ns polyphase signal samples associated with the received signal may be generated by decimating the received signal by a value of Ns, where for example $N_s$ is the oversampling rate for the received signal. The hypothetical delay value for each of the Ns polyphase signal samples is preferably based on the estimated position of the predetermined sample within the received signal. It should be noted that processing and comparison is preferably repeated for each of the Ns polyphase signal samples to provide corresponding difference values the parameter chosen corresponding to the delay corresponding to the smallest difference value.

Preferably, the received signal includes a Gaussian Minimum Shift Keying (GMSK) modulated signal and the receiver includes a Global System Mobile (GSM) receiver although the invention can be practiced on other types of signal-system combinations without departing therefrom. The predetermined or known sample and received signal preferably includes a training sequence (TS).

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as digital signal processors or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, a simplified and representative diagram of exemplary scenario 100 having communication unit 110, signal 120, and wireless channel or air interface 121, are shown. Exemplary signal 120, as noted above, is preferably a GMSK modulated signal transmitted in a burst, and may further include preambles and postambles, or tails 122 at each end thereof, data sections 123, and a midamble 124, which may preferably include a sequence known, a priori, such as a TS as noted above, and to be described in greater detail hereinafter.

Figure 2:
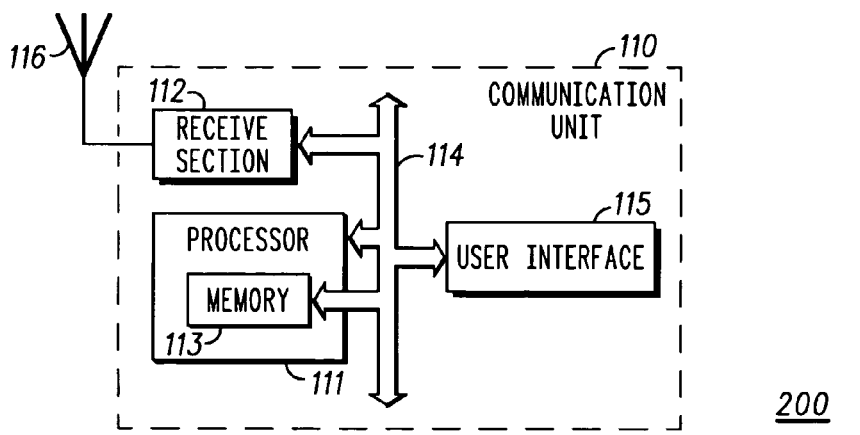
FIG. 2 is a block diagram depicting components of the exemplary communications unit.

To provide a better understanding of the operating environment in accordance with various exemplary and alternative exemplary embodiments, a more detailed block diagram of exemplary communication unit 110 is shown in FIG. 2. Therein, communication unit 110 is shown to include a receive section 112 which may be an analog front end or the like, for processing raw incoming baseband signals, for example, from antenna 116, and providing conditioned signals such as digital signals, I and Q or in-phase and quadrature components, real and imaginary components, or the like to other sections or devices by way of interconnection 114 which may be a signal path, bus, or the like. It will further be appreciated that various functions such as analog-to-digital conversion or other conditioning, decoding, or the like, of the incoming signal or samples representative thereof may be allocated in one or several sections within communication unit 110. Further, various inputs and outputs may be generated relevant to a user, which inputs and outputs may be sent and received from user interface 115.

The exemplary receiver shown in FIG. 2, may further include processor 111 having memory 113 associated therewith. It will be appreciated that memory 113 may be an internal memory, an external memory, or the like as would be known by one of ordinary skill and sufficiently matched, for example, to the speed and other performance related characteristics of processor 111, receive section 112, bus 114 and other devices within communication unit 110 to enable useful storage of and access to programs, data, instructions, or the like associated with receiver operation in accordance with various embodiments.

Figure 3:
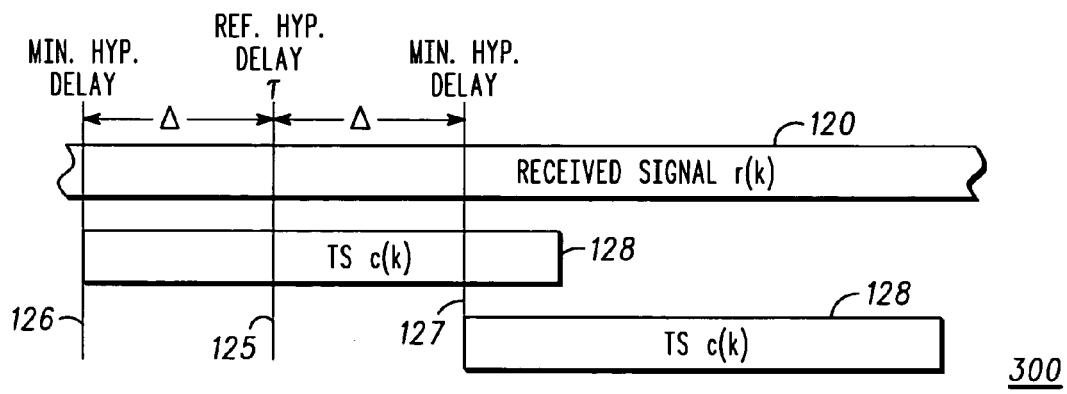
FIG. 3 is a diagram further depicting an exemplary received signal and sequence with various delays.

An exemplary approach to channel parameter estimation such as delay estimation, is shown in FIG. 3. There hypothetical delay 125 associated, for example, with an estimated or arbitrary value set for an arrival time associated with received signal 120 is chosen. It should be noted that the reference value for hypothetical delay 125 may be arbitrarily chosen as the beginning of a known sequence such as, for example, a 26-symbol TS known a-priori to occur within $\pm\Delta$, $-\Delta$ at 126 and $+\Delta$ at 127 of the reference delay T established at hypothetical delay 125. In practice the estimated or reference delay t may be chosen as the last estimate for this delay, for example from the previous input signal burst 120.

In one known approach or scheme for channel estimation or equalization, a complex conjugate $c^*(k)$ of the known sequence such as the 26-symbol TS sequence $c(k)$ 128 is preferably correlated with the received signal $r(k)$ 120 over a number $2\Delta N_s/T_s+1$ of delays after appropriate complex rotation of $c^*(k)$ to emulate the GMSK modulation process, where $T_s$ is the symbol interval, and $N_s$ is the over-sampling factor. A length-$2\Delta N_s/T_s+1$ vector $\Gamma$ of correlation results is thus formed. If communication unit 110 is subsequently designed to operate using symbol-rate sampling, the optimal delay may be computed by identifying the length-L symbol rate sampling vector $\phi_n$ associated with elements extracted from $\Gamma$ within the maximum norm, where L is the maximum channel impulse response length, for example 5 symbols, for which the subsequent detector is designed, and where $\phi_n$ is obtained by decimating by $N_s$ – i.e. $\phi_n(m)=\Gamma(n+mN_s)$, for $0\leq m<L$.

In the co-pending application noted above, Ser. No. 10/366,106, a method is described for improving the reception of GMSK signals in the presence of interfering signals, such as other GMSK signals generating on-channel interference, the method termed Alternate Linear Output Equalizer (ALOE). Applying many of essentially the same techniques for ALOE, the quality or accuracy of the optimum delay estimate for a received signal at a receiver can be significantly improved over the classical correlation method described above. Various techniques are utilized to reduce noise or other on channel interference and thereby improve the estimate for the delay or other associated parameter. Further, a method for making the required computations with very low computational complexity will be described hereinafter.

One embodiment of a method for computing an optimal reference delay value for an ALOE or any other receiver begins by providing a signal sample corresponding to the received signal. In some embodiments this can comprise decimating a received signal $r(k)$ 120 by a factor $N_s$ to generate $N_s$ polyphase signals sampled at the symbol rate. For example, in one embodiment the received signal is over-sampled at a rate of 2, e.g. $N_s=2$ and decimation amounts to collecting every other sample for a first polyphase signal with the other samples collected for a second polyphase signal. Given the signal sample it is processed to suppress on channel interference and provide a processed sample. This processing relies on known properties of the received signal to suppress on channel interference and in one embodiment these properties comprise a known quadrature phase relationship for a predesignated set of symbols in a portion of the received signal, specifically the TS in the figures although any other known sequence with known and similar properties could be utilized. For example the TS used in GSM systems employing GMSK modulation is comprised of 26 symbols where the symbols alternate between wholly imaginary and real symbols with imaginary symbols alternating between $-j$ and $+j$ and real symbols alternating between $+1$ and $-1$, e.g. $-j, +, j, -1, -j, \ldots$ for a sequence of 26 symbols.

The processing of the signal sample includes establishing a hypothetical delay for the signal sample based on an estimated delay for the signal, processing the received signal to provide a received signal estimate using the hypothetical delay, the signal sample, and the predetermined or known sample or sequence, comparing the received signal estimate to the predetermined sample to generate a difference value, and selecting or choosing the delay parameter based on the difference value corresponding to the hypothetical delay used to provide the difference value. To provide a choice or selection of difference values and thus choice of a delay parameter a plurality of delays or hypothetical delays are used as further discussed below in alternative embodiments.

In one embodiment the establishing the hypothetical delay further comprises, for each polyphase signal, a set of $N_d=2\Delta/T_s+1$ delays are established over the region $\tau\pm\Delta$ as noted before from a reference delay for example set at hypothetical delay 125, to $-\Delta$ at 126 and $+\Delta$ at 127. The range for the hypothetical delays will depend on system and channel characteristics and can be experimentally determined. However, one embodiment has provided satisfactory results where the range was +/−2 symbol time periods. It will be appreciated that each delay corresponds to the hypothesized start of the TS sequence $c(k)$ 128 in received signal $r(k)$ 120, and for each delay $0 \leq n < N_d$ an associated observation vector $r_n$ is extracted as shown, for example, as vector $r_0$ 129 and vector $r_{Nd-1}$ 130, each of length $N_r$. Extracting the vectors r amounts to selecting the samples from the signal sample or specifically one of the polyphase signals corresponding to the $N_r$ samples beginning at the corresponding hypothetical delay.

Figure 4:
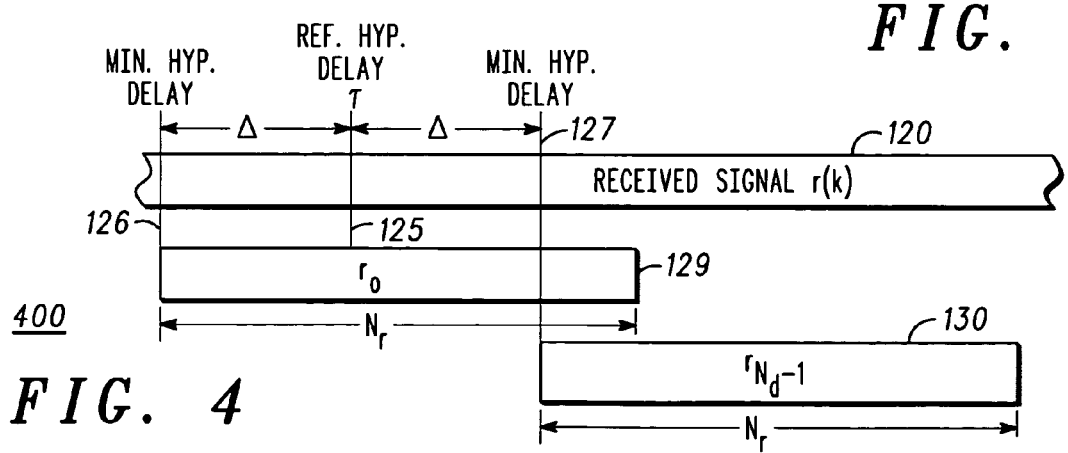
FIG. 4 is a diagram further depicting an exemplary received signal and extracted signal vector with various delays.

For each hypothesized delay n, an ALOE solution vector is then computed in the fashion described below as well as in co-pending application Ser. No. 10/366,106. That is, successive real and imaginary parts of the output of a length-L linear estimator are compared to successive real and imaginary parts of TS sequence c(k) 128. More precisely, given that the TS sequence c(k) 128 includes a length-26 modified TS vector $t = [t_r(0), t_r(1), t_r(2), t_r(3) L, t_r(25)]^T$, where $t_r(m)$ and $t_r(m)$ are the real and imaginary components respectively of the m-th TS symbol (hence the vector t is wholly real valued), the ALOE solution vector is the optimal linear estimator weight vector $w_k^t$ (determined according to EQ 2 discussed below) or that vector which minimizes the difference value or error $\epsilon_n = \|t - \hat{t}_n\|^2$, where $\hat{t}_n$ is the signal estimate (real valued) corresponding to the nth hypothetical delay and is based on the length-$N_r$ observation vector $r_n$ ($N_r$=L+26-1). L is the channel delay spread or more specifically the delay spread for the channel that the processing system is able to model. In one embodiment a value of 5 symbol times has been found to be appropriate. As noted above $r_n$ is extracted from received signal r(k) 120 starting at the n-th reference value for hypothetical delay 125 according to FIG. 3 and FIG. 4 and from above will be comprised of 30 adjacent samples. Thus a signal estimate $\hat{t}_n$ corresponding to each of the hypothetical delays has been determined and each of these signal estimates can be compared to the known or predetermined sample t to generate the $N_d$ difference values according to $\epsilon_n = \|t - \hat{t}_n\|^2$. The best estimate for the delay parameter is then chosen as the hypothetical delay corresponding to the smallest error or difference value.

It should be noted that the computation of $\hat{t}_n$ is preferably accomplished by further decomposing vector $r_n$ into a sequence of length-L column observation vectors y(n) and computing $\hat{t}_n$ according to Equation (1):

$$\hat{t}_n = \begin{bmatrix} y_i^T(0) & -y_r^T(0) \\ y_r^T(1) & y_i^T(1) \\ M & M \\ y_r^T(25) & y_i^T(25) \end{bmatrix} \begin{bmatrix} w_r^\dagger \\ w_i^\dagger \end{bmatrix} @ Z_n w \quad \text{EQ (1)}$$

where $y_r(m)$ and $y_i(m)$ denote respectively the real and imaginary part of y(m). Thus $y_1(0)$ transpose is the imaginary parts of the first L=5 samples or if sampled at the symbol rate first L symbol observations, e.g. observations 0, 1, 2, 3, 4 of the vector $r_n$. Thus the matrix with the y vectors is a 26 by 10 matrix and this matrix is defined as the Z matrix. The ALOE solution vector w is composed of 10 elements, e.g. 5 real and 5 imaginary elements. Accordingly, optimum delay $n^t$ may be identified as that delay which minimizes $\epsilon_n$ for $0 \leq n < N_d$. In the case $N_s > 1$, the optimum delay would be extracted from the polyphase signal with the smallest value of $\epsilon_n$.

Figure 5:
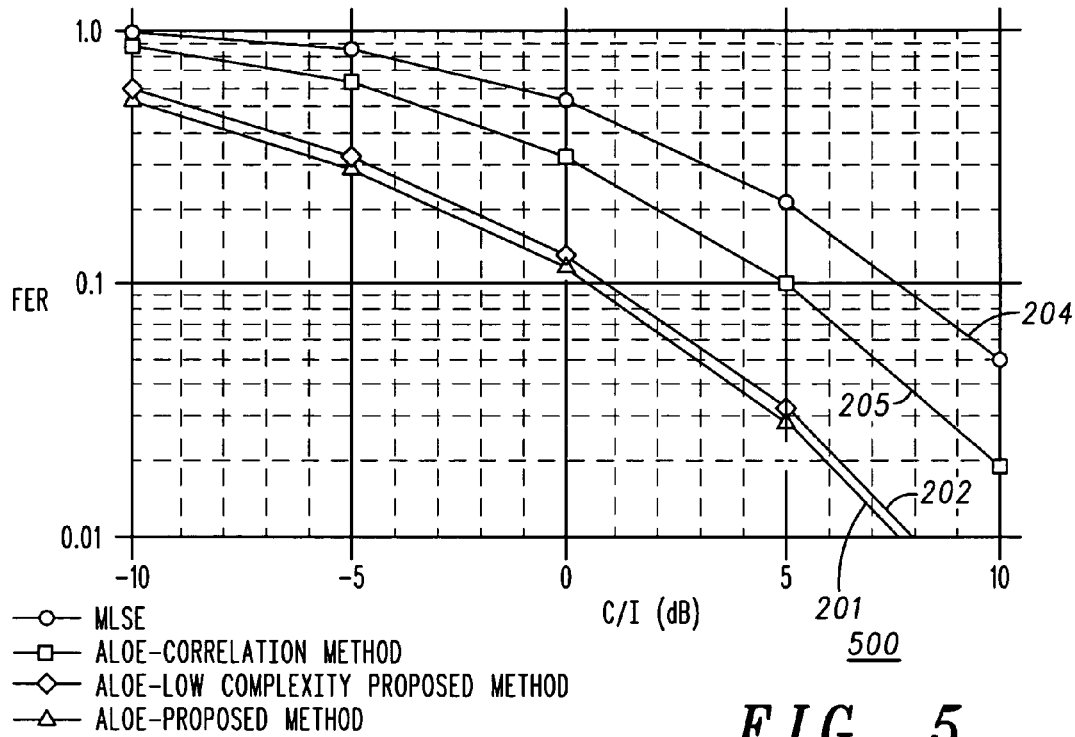
FIG. 5 is a graph illustrating improvements gained using various exemplary methods.

A comparison of the performance of the different approaches, both in accordance with various exemplary and alternative exemplary embodiments, and relative to a reference correlation method, can be seen in FIG. 5. FIG. 5 depicts the performance of a receiver using various approaches for signal recovery and is indicative of the performance that can be achieved using the delay parameter estimation approach discussed above as well as the simplified or low complexity approach discussed below with reference to FIG. 6. FIG. 5 shows frame error rates (FER) on the vertical axis versus carrier to interference ratios in dB on the horizontal axis. Note that the performance indicated by curves 201, 202 require very accurate estimates for the delay parameter. FIG. 5 shows performance data for a Maximum Likelihood Sequence Estimation (MLSE) receiver at curve 204 and an ALOE receiver using a correlation approach for delay estimation at curve 205, as well as data for additional approaches in accordance with various exemplary embodiments disclosed and described herein. It should be noted that the performance of an exemplary ALOE correlation method (curve 205) on an exemplary TCH-FS logical channel is comparatively shown with the performance of an exemplary method (curve 201) and a low-complexity version exemplary method (curve 202). It can be seen that the improvement in performance using exemplary method 201 and low complexity method 202 are both around 3.5 dB at 3% FER, with the low complexity method 202 sacrificing an insignificant degree of performance in exchange for significant improvements in the reduction of computational complexity. With reference again to FIG. 5, the low-complexity implementation, that is, exemplary method (curve 202), can be seen to exhibit very little loss of performance compared to the complete implementation discussed above and depicted by curve 201.

The inventive low complexity method (performance indicated by curve 202) arises from dependency of $Z_n$ for example as shown in Equation (1) on n, and the need in accordance with exemplary approach discussed above to compute the weight vector w associated with each hypothesized delay in order to generate $\epsilon_n$ and in turn, the optimization of $\|t - \hat{t}_n\|^2$ over w. This can be accomplished by conventional least-squares methods, so that:

$$w_n^t = (Z_n^H Z_n)^{-1} Z_n^H t \quad \text{EQ (2)}$$

It can be appreciated that the computation of each $\epsilon_n$ and thus a version of $\hat{t}_n$ requires a new matrix inversion operation as the matrix $Z_n$ is updated according to the hypothesized delay n or in accordance with the vector $r_n$, thus requiring $N_s N_d$ matrix inversions which as can be appreciated can be computationally expensive and sometime computationally prohibitive.

Figure 6:
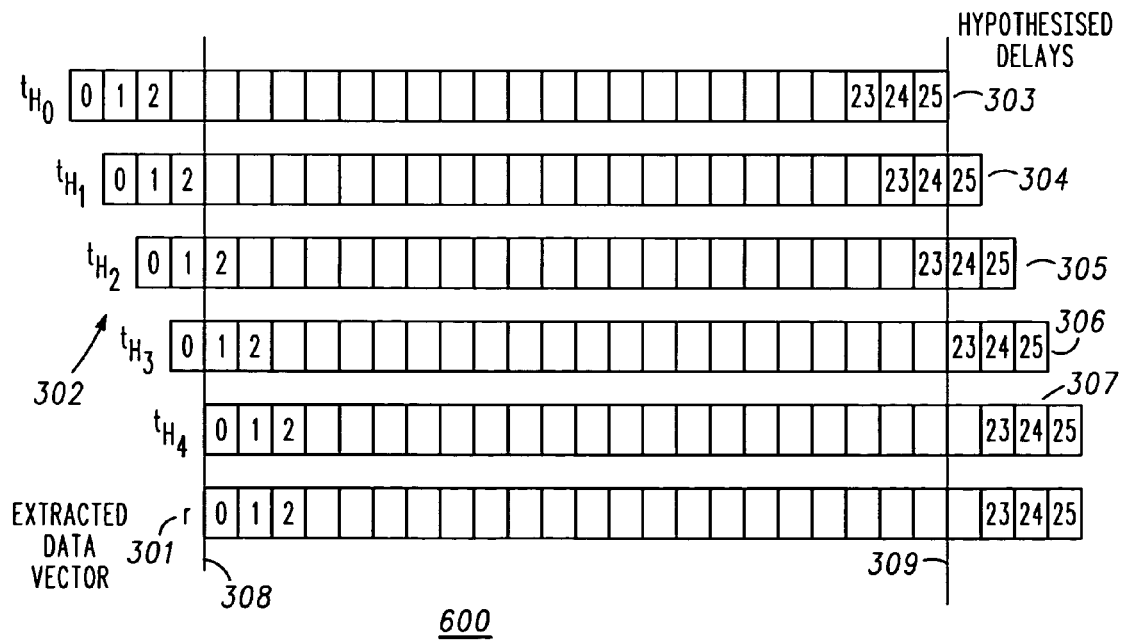
FIG. 6 is a diagram further depicting an exemplary embodiment of a method for estimating a channel parameter.

Thus the basis for an exemplary low complexity approach, with the performance depicted for example by the curve 202, appears in greater detail in FIG. 6. Therein, vector r 301 is preferably extracted once and only once from each of the polyphase signals corresponding to received signal r(k) 120. It should be noted that in accordance with the particular example shown in FIG. 6, $\Delta = 2T_s$, a single polyphase is shown associated with for example, vector r 301, and the method is repeated for each polyphase signal generated in the decimation process as described. For each of the $N_d$ hypothesized delays and associated sequences 303-307, where, as shown in the example, $N_d$=5, a sub-sequence or portion of the TS corresponding to the n-th hypothesized delay is denoted $t_{H_n}$ 302, and is extracted as shown to be described further hereinafter. It can be seen that the operative portion of $t_{H_n}$ 302 corresponds to the portion of each sequence between time references 308 and 309.

Thus the $Z_n$ matrix can be populated using the portion of the vector r, namely samples 0-21 and thus the matrix will be a 22 by 10 matrix with L=5. The $w^t$ vector can be calculated from EQ (2) by substituting the appropriate $t_H$ for the corresponding delay, where $t_H$ corresponds to the portion of the TS between the time references 308 and 309. Given the $w^t$ vector EQ (1) can be used to determine the signal estimate for each hypothesized delay and the revised error metric or difference value $\epsilon_n = \|t_{H_n} - \hat{t}_{H_n}\|^2$ can be generated by comparing the known or predetermined sample or portion thereof to the corresponding signal estimate. Note that for each polyphase signal only one matrix inversion is required.

Thus the alternative approach referred to above comprises the establishing a hypothetical delay for the signal sample and this further comprises establishing a set of $N_d$ hypothetical delays for the signal sample. The processing the received signal to provide the received signal estimate further comprises: extracting a portion of the signal sample r 301 corresponding to one of the $N_d$ hypothetical delays and $N_d$ portions 302 of the predetermined sample or known sequence, where one portion 303-307 corresponds to each of the $N_d$ hypothetical delays and determining a corresponding signal estimate for each of the $N_d$ hypothetical delays, using the $N_d$ portions and the portion of the signal sample to provide $N_d$ corresponding signal estimates. The comparing the received signal estimate further comprises comparing each of the $N_d$ corresponding signal estimates to the corresponding one of the $N_d$ portions of the predetermined sample or known sequence to generate $N_d$ difference values; and the choosing the delay parameter further comprises choosing the hypothetical delay as the delay parameter for the received signal that corresponds to the smallest difference value. Note that this simplified approach can also be used for determining, for example filter weights for a channel equalization filter, such as discussed in the above identified co-pending application, at a dramatic reduction in computational complexity. Further simplification is also available for determining a channel parameter, such as a delay parameter estimation and this will be discussed with reference to FIG. 7.

Figure 7:
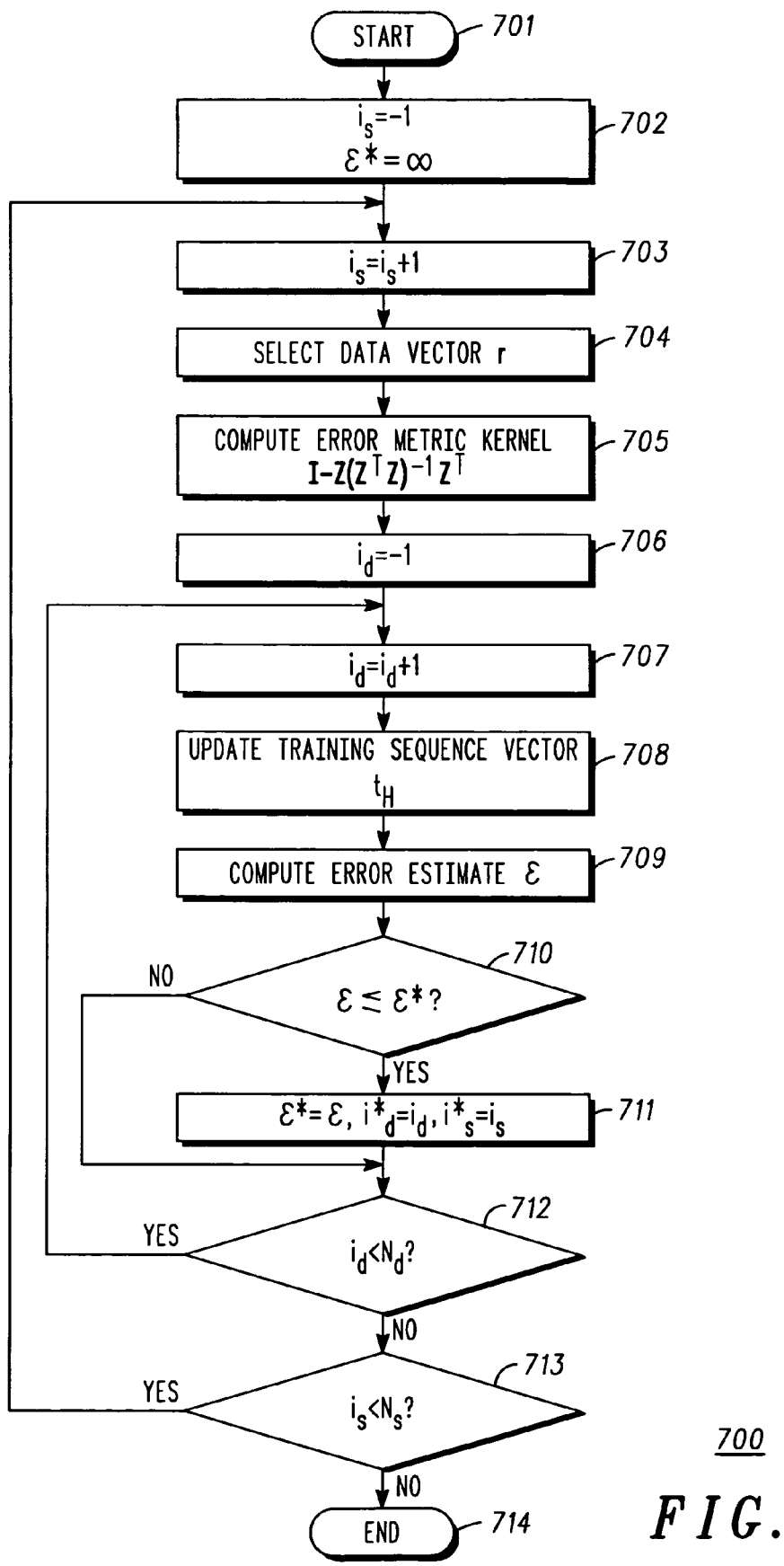
FIG. 7 is a flow chart illustrating an exemplary low-complexity method for estimating delay or corresponding parameters.

This elegant and computationally efficient method may be better illustrated in accordance with a flow chart as shown in FIG. 7. After starting at 701, initialization may be performed for example at 702 to initialize a polyphase index to below zero (−1) and to initialize the error value to a large number shown as infinity as would be understood to one of ordinary skill. In 703, the polyphase index $i_s$ may be incremented to correspond to processing of the first sample vector r selected at 704. An error metric kernel is then computed, as $I - Z(Z^T Z)^{-1} Z^T$ in 705, where this can be shown to amount to multiplying EQ (2) by Z and simplifying. The delay index may be initialized to −1 in 706 and incremented in 707 corresponding to processing in accordance with the first delay. The training sequence or portion thereof, illustrated, for example, as the portions between time references 308 and 309 shown in FIG. 6 may be updated in 708 and the error estimate $\epsilon$ computed as $\epsilon = t^T_H (I - Z(Z^T Z)^{-1} Z^T) t_H$.

It should be noted that the previous expression may be implemented in some embodiments more straightforwardly using the relations:

$$\epsilon = t^T_H t_H - t^T_H Z(LL^T)^{-1} Z^T t_H \quad \text{EQ (3.1)}$$

$$= t^T_H t_H - (t^T_H Z L^{-T})(L^{-1} Z^T t_H) \quad \text{EQ (3.2)}$$

$$= t^T_H t_H - (L^{-1} Z^T t_H)^T (L^{-1} Z^T t_H) \quad \text{EQ (3.3)}$$

$$= t^T_H t_H - b^T_H b_H \quad \text{EQ (3.4)}$$

where $b_H = L^{-1} Z^T t_H$ and is preferably computed using the Cholesky decomposition as is understood by those of ordinary skill in the art, where L is a lower triangular matrix and thus $L^{-1}$ is easily calculated. In 710 the error result may be compared against the previously obtained minimum result $\epsilon^*$ or the initial $\epsilon^*$ which is set as noted above to an infinitely high value within the constraints of the numerical precision of, for example, the processor. If the difference value $\epsilon^*$ is smaller than $\epsilon^*$, $\epsilon^*$ is updated and the delay index and polyphase index are recorded at 711. If the value is not smaller than the existing value for $\epsilon^*$ or after 711 a test may be made at 712 to determine whether more hypothetical delays are present to be tested, and if so, control passes back to 707 and 708-710 are repeated for each hypothetical delay. When no more delays are present to be processed, a test may be performed at 713 to determine whether more samples are present to be tested through a full set of delays. If not, it can be concluded that all samples have been processed with all hypothetical delays and the process ended at 714. It should be noted that for each hypothesized signal delay, a revised error metric $\epsilon_n = \|t_{N_n} - \hat{t}_{N_n}\|^2$ is generated. Identification of the optimal weight vector associated with each delay only requires, however, the substitution of each hypothesized TS sub-sequence or portion $t_{H_n}$ 303-307 into equation 2 in place of t. When the further simplified approach of FIG. 7 is used, the weight vector is not explicitly computed and thus only the effect of the weight vector is known as reflected in the error result. It will be appreciated that further minor operations may be required on each $t_{H_n}$ in order to compensate for, for example, the per-symbol phase rotation associated GMSK modulation, but such operations are of negligible complexity.

Accordingly, in this exemplary method, only a single matrix inversion per polyphase or signal sample is required to estimate the optimal delay. Since the length of the TS that is actually used in processing is reduced from 26 to $26 - N_d + 1$, corresponding to, for example, the portion between time intervals 308 and 309 described with reference to FIG. 6 hereinabove, there is some slight loss of performance. More importantly, the number of matrix inversions per polyphase or signal sample is reduced from $N_d$ to 1, permitting approximately an $N_d$-times reduction in complexity. Such a reduction is possible since the complexity of the entire delay estimation procedure is dominated by the computational cost of performing the matrix inversion. Thus for a typical value of Nd=5, a five-fold reduction in complexity accrues.

Figure 8:
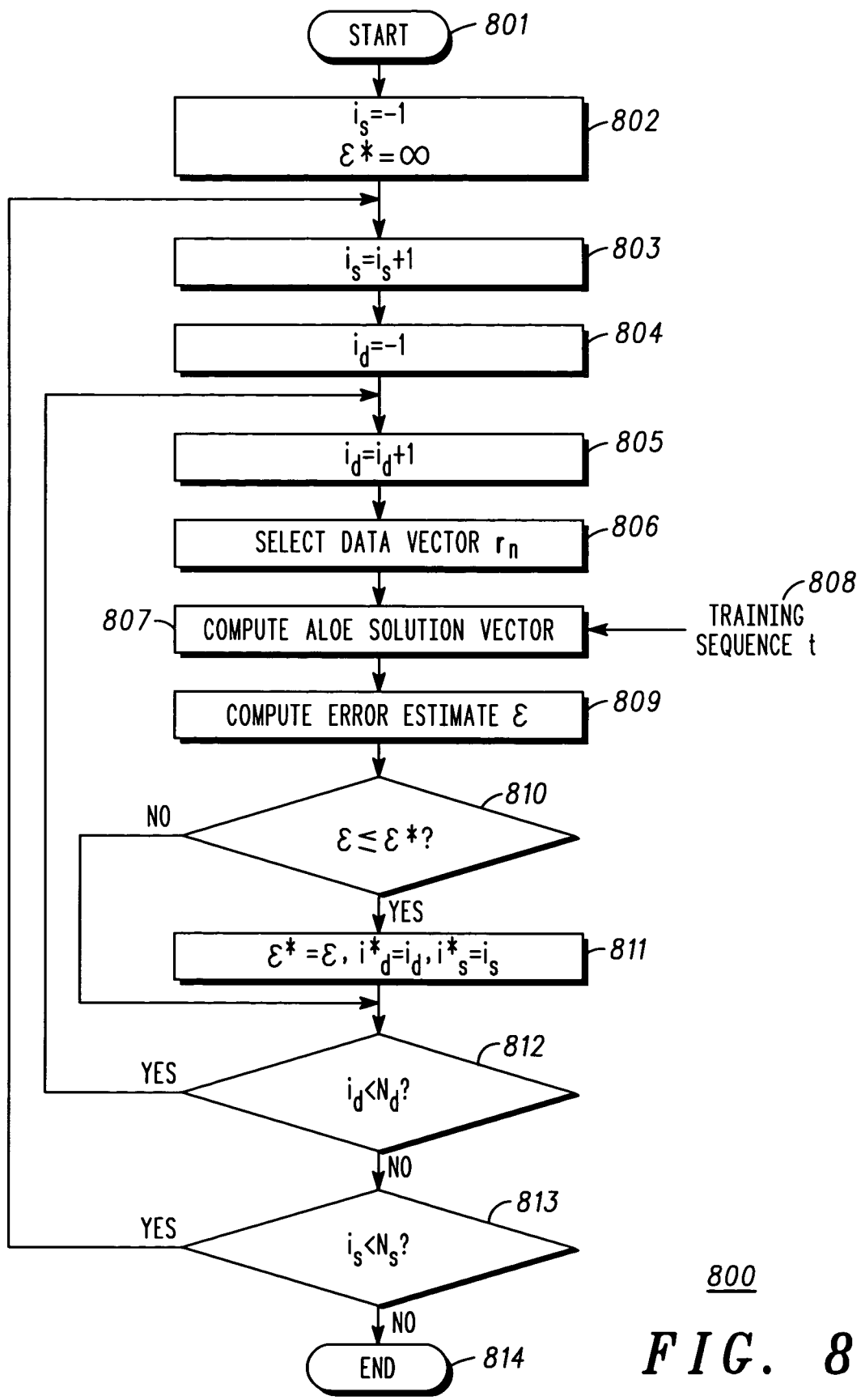
FIG. 8 is a flow chart illustrating another exemplary method for estimating a delay parameter.

With reference to the FIG. 8 flow chart, an exemplary method of estimating a parameter, such as a delay parameter, as discussed above in greater detail is illustrated wherein a data vector is extracted for every hypothetical delay as previously described. This discussion is somewhat in the nature of a review and the reader is referred to the above detailed discussions for various details. After starting at 801, values may be initialized as above, to −1 for the polyphase index and an infinitely high value for $\epsilon^*$. At 803, the sample index may be incremented and the delay index initialized to −1 at 804. At 805 the delay index may be incremented. At 806 a data or received signal sample or received vector $r_n$ corresponding to the present delay is selected and a solution vector such as an ALOE solution vector calculated in 807 in accordance with the description herein above in connection with EQ (2).

An error estimate may further be calculated at 809 in accordance with $\epsilon_n = \|t - \hat{t}_n\|^2$, however it should be noted that each calculation of $\hat{t}_n$, a matrix inversion is required as described above increasing the computational complexity since it can be seen that the error estimate is calculated for each hypothetical delay associated with each sample vector $r_n$. If at 810 the error estimate $\epsilon$ is less than the previously calculated error estimate $\epsilon^*$, then at 811 the new value is substituted for the old value and the sample and delay indexes are stored to identify the delay and sample that minimized the difference value or error. If not or after 811, control passes to 812 where a test is performed to determine whether more delays need to be tested for the present sample. If more delays need to be tested at 812, control passes back to 805 where 806-812 are repeated until no more delays are left to be tested. If no delays remain to be tested, a test may be performed at 813 to determine whether more samples, corresponding to more polyphase signals need to be tested. If more samples need to be tested at 813, control passes back to 803 wherein 804-813 are repeated until no more samples remain to be tested.

Thus methods and apparatus for advantageously determining channel parameters, such as a delay parameter and the like have been disclosed, where certain embodiments represent a dramatic reduction in computational complexity. The reduced complexity approaches are suitable in general for providing, for example, channel equalization filter values or weighting values. When used to provide increased accuracy delay parameter estimates, superior receiver performance can be observed. These methods and apparatus may be advantageously used in or embodied or configured in receivers, such as GSM receivers or communications units, such as cellular telephones and similar devices. One apparatus embodiment includes a conventional receiver front end for providing a received signal and a processor, for example a DSP and supporting functionality that is configured to implement the various functions noted above.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, in a wireless receiver, for estimating a delay parameter
    associated with a received signal, the method comprising:
    providing a signal sample corresponding to the received signal;
    processing the signal sample to suppress on channel interference and provide a processed sample, the processing relying on one or more known properties between pre-designated symbols of the received signal; and
    determining the delay parameter by comparing the processed sample to a predetermined sample.

2. The method of claim 1 wherein the processing the signal sample to suppress the on channel interference relies on a known quadrature phase relationship for the predesignated set of symbols in a portion of the received signal.

3. The method of claim 1 wherein the processing the signal sample and determining the delay parameter further comprises:
    establishing a hypothetical delay for the signal sample based on an estimated delay for the received signal;
    processing the received signal to provide a received signal estimate using the hypothetical delay, the signal sample, and the predetermined sample; and
    comparing the received signal estimate to the predetermined sample to generate a difference value; and
    choosing the delay parameter based on the difference value corresponding to the hypothetical delay.

4. The method of claim 3 wherein:
    the establishing a hypothetical delay for the signal sample further comprises establishing a set of $N_d$ hypothetical delays for the signal sample;
    the processing the received signal to provide the received signal estimate further comprises:
        extracting $N_d$ portions of the signal sample, one portion corresponding to each of the $N_d$ hypothetical delays; and
        a corresponding signal estimate for each of the $N_d$ hypothetical delays, using the $N_d$ portions and the predetermined sample to provide $N_d$ corresponding signal estimates;
    the comparing the received signal estimate further comprises comparing each the $N_d$ corresponding signal estimates to the predetermined sample to generate $N_d$ difference values; and
    the choosing the delay parameter further comprises choosing the hypothetical delay as the delay parameter for the received signal that corresponds to the smallest difference value.

5. The method of claim 3 wherein
    the establishing a hypothetical delay for the signal sample further comprises establishing a set of $N_d$ hypothetical delays for the signal sample;
    the processing the received signal to provide the received signal estimate further comprises:
        extracting a portion of the signal sample corresponding to one of the $N_d$ hypothetical delays and $N_d$ portions of the predetermined sample, one portion corresponding to each of the $N_d$ hypothetical delays; and
        determining a corresponding signal estimate for each of the $N_d$ hypothetical delays, using the $N_d$ portions and the portion of the signal sample to provide $N_d$ corresponding signal estimates;
    the comparing the received signal estimate further comprises comparing each of the $N_d$ corresponding signal estimates to the corresponding one of the $N_d$ portions of the predetermined sample to generate $N_d$ difference values; and
    the choosing the delay parameter further comprises choosing the hypothetical delay as the delay parameter for the received signal that corresponds to the smallest difference value.

6. The method acconling to claim 3, wherein:
    the providing the signal sample corresponding to the received signal further comprises generating $N_s$ polyphase signal samples associated with the received signal by decimating the received signal by $N_s$;
    the establishing the hypothetical delay further includes establishing the hypothetical delay value for each of the $N_s$ polyphase signal samples based on the estimated position of the
    predetermined sample within the received signal; and
    the processing and the comparing are repeated for each of the $N_s$ polyphase signal samples to provide $N_s$ difference values, and the choosing includes choosing the parameter corresponding to a smallest difference value.

7. The method of claim 1, wherein the received signal includes a Gaussian Minimum Shift Keying (GMSK) modulated signal.

8. The method of to claim 1, wherein the receiver includes a Global System Mobile (GSM) receiver.

9. The method according to claim 1, wherein the predetermined sample comprises a training sequence (TS).

10. A method for estimating a parameter associated with a received signal in a wireless receiver, the method comprising:

extracting a vector r from the received signal;

establishing a set of hypothetical delays for the received signal based on an estimated position of a known sequence within the received signal;

processing the received signal using on-channel interference reduction processes to provide received signal estimates with one estimate for each of the hypothetical delays, using the vector r and the known sequence;

comparing the received signal estimates with the known sequence to generate difference values with one difference value for each of the hypothetical delays; and choosing the parameter that corresponds to a minimum difference value.

11. The method according to claim 10, further comprises:

decimating the received signal by a factor $N_s$ to generate $N_s$ signal samples associated with the received signal; and wherein the extracting includes extracting $N_s$ vectors r, one of the $N_s$ vectors r from each of the $N_s$ signal samples;

the establishing includes establishing the set of hypothetical delays for the each of the $N_s$ signal samples based on the estimated position of the known sequence within the received signal; and the processing and the comparing are repeated for each of the $N_s$ signal samples to provide $N_s$ difference values, and the choosing includes choosing the parameter corresponding to a smallest difference value.

12. The method of claim 10 wherein:

the extracting a vector r further comprises extracting a set of vectors $r_n$ from the received signal with each one of the set of vectors $r_n$ corresponding to a different hypothetical delay of the set of hypothetical delays;

the processing the received signal to provide the received signal estimates further comprises determining a corresponding signal estimate for each of the hypothetical delays, using one of the set of vectors $r_n$ corresponding to the each of the hypothetical delays and the known sequence to provide a set of corresponding signal estimates; and the comparing the received signal estimate further comprises comparing each the set of corresponding signal estimates to the known sequence to generate a set of difference values.

13. The method of claim 10 wherein the processing the received signal to provide the received signal estimates further comprises:

extracting a set of portions of the known sequence, one portion corresponding to each of the set of hypothetical delays; and determining a corresponding signal estimate for each of the set of hypothetical delays, using the vector r and a corresponding portion of the set of portions of the known sequence to provide the received signal estimates; and the comparing the received signal estimates further comprises comparing each of the received signal estimates to the corresponding portion of the set of portions of the known sequence to generate the difference values.

14. The method according to claim 10, wherein the received signal includes a Gaussian Minimum Shift Keying (GMSK) modulated signal.

15. The method according to claim 10, wherein the wireless receiver includes a Global System Mobile (GSM) receiver.

16. The method according to claim 10, wherein the known sequence includes a training sequence (TS).

17. The method according to claim 10, wherein the parameter includes one of a delay parameter corresponding to the received signal and weighting values for an equalization filter.

18. An apparatus for estimating a delay parameter associated with a received signal, the apparatus comprising:

a receiver capable of providing the received signal; and a processor coupled to the receiver, the processor configured to:

generate a signal sample associated with the received signal;

process the signal sample to suppress on channel interference relying on a known structure of the on channel inference, the on channel interference caused by at least one of a co-channel signal and an adjacent channel signal, and provide a processed sample; and determine the delay parameter by comparing the processed sample to a known sequence.

19. The apparatus of claim 18 wherein the processor is further configured to process the signal sample to suppress the on channel interference using known properties of the received signal.

20. The apparatus of claim 19 wherein the known properties of the received signal include a known quadrature phase relationship for symbols in a portion of the received signal.

21. The apparatus of claim 18 wherein the processor configured to process the signal sample and determine the delay parameter is further configured to:

establish a hypothetical delay for the signal sample based on an estimated delay corresponding to the received signal;

process the received signal to provide a received signal estimate using the hypothetical delay, the signal sample, and the known sequence;

compare the received signal estimate to the known sequence to generate a difference value; and choose the delay parameter based on the difference value corresponding to the hypothetical delay.

22. The apparatus of claim 21 wherein:

to establish the hypothetical delay for the signal sample further comprises establishing a set of $N_d$ hypothetical delays for the signal sample;

to process the received signal to provide the received signal estimate further comprises:

extracting $N_d$ portions of the signal sample, one portion corresponding to each of the $N_d$ hypothetical delays; and determining a corresponding signal estimate for each of the $N_d$ hypothetical delays, using the $N_d$ portions and the known sequence to provide $N_d$ corresponding signal estimates;

to compare the received signal estimate further comprises comparing each the $N_d$ corresponding signal estimates to the predetermined sample to generate $N_d$ difference values; and to choose the delay parameter further comprises choosing the hypothetical delay as the delay parameter for the received signal that corresponds to the smallest difference value.

23. The apparatus of claim 21 wherein to establish a hypothetical delay for the signal sample further comprises establishing a set of $N_d$ hypothetical delays for the signal sample;

to process the received signal to provide the received signal estimate further comprises:

extracting a portion of the signal sample corresponding to one of the $N_d$ hypothetical delays and $N_d$ portions of the known sequence, one portion corresponding to each of the $N_d$ hypothetical delays; and determining a corresponding signal estimate for each of the $N_d$ hypothetical delays, using the $N_d$ portions and the portion of the signal sample to provide $N_d$ corresponding signal estimates;

to compare the received signal estimate further comprises comparing each the $N_d$ corresponding signal estimates to the corresponding one of the $N_d$ portions of the known sequence to generate $N_d$ difference values; and to choose the delay parameter further comprises choosing the hypothetical delay as the delay parameter for the received signal that corresponds to the smallest difference value.

24. The apparatus according to claim 21, wherein:

to generate the signal sample corresponding to the received signal further comprises generating $N_s$ polyphase signal samples associated with the received signal by decimating the received signal by $N_s$;

to establish the hypothetical delay further includes establishing the hypothetical delay value for each of the $N_s$ polyphase signal samples based on the estimated position of the known sequence within the received signal; and the process and the compare processes are repeated for each of the $N_s$ polyphase signal samples to provide $N_s$ difference values, and the choosing includes choosing the parameter corresponding to a smallest difference value.

25. The apparatus of claim 18, wherein the received signal includes a Gaussian Minimum Shift Keying (GMSK) modulated signal.

26. The apparatus of claim 18 incorporated in a Global System Mobile (OSM) receiver.

27. The apparatus according to claim 18, wherein the known sequence comprises a training sequence (TS).

28. The apparatus of claim 18 incorporated in a ceflular telephone.

* * * * *